United States Patent
Lutz

(10) Patent No.: US 11,360,650 B2
(45) Date of Patent: Jun. 14, 2022

(54) CONTROL SYSTEM FOR A TECHNICAL INSTALLATION WITH TREND CURVE DIAGRAM

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/065,624

(22) Filed: Oct. 8, 2020

(65) Prior Publication Data

US 2021/0109504 A1 Apr. 15, 2021

(30) Foreign Application Priority Data

Oct. 10, 2019 (EP) .................................. 19202506

(51) Int. Cl.
*G06F 3/0484* (2022.01)

(52) U.S. Cl.
CPC ................... *G06F 3/0484* (2013.01)

(58) Field of Classification Search
CPC ........ G05B 15/02; G05B 11/01; G06F 3/0484
See application file for complete search history.

(56) References Cited

U.S. PATENT DOCUMENTS

| | | | |
|---|---|---|---|
| 5,289,205 A | 2/1994 | Torres | |
| 7,720,552 B1 | 5/2010 | Lloyd | |
| 2008/0208373 A1 | 8/2008 | Thurau | |
| 2012/0119901 A1 | 5/2012 | Hollender et al. | |
| 2012/0259436 A1* | 10/2012 | Resurreccion | G05B 23/0216 700/17 |
| 2014/0081430 A1 | 3/2014 | Timsjo et al. | |

(Continued)

FOREIGN PATENT DOCUMENTS

| | | |
|---|---|---|
| DE | 102018124303 | 4/2019 |
| EP | 0511941 | 11/1992 |

(Continued)

OTHER PUBLICATIONS

EP Search Report dated May 7, 2020 based on EP19202506 filed Oct. 10, 2019.

*Primary Examiner* — Mong-Shune Chung
(74) *Attorney, Agent, or Firm* — Cozen O'Connor

(57) ABSTRACT

A control system of a technical installation includes an operator station client and an operator station server that has a visualization service and stored object models of technical objects of the technical installation and generates an XY trend diagram with an operating point visualized in the XY trend diagram from a first measurement value associated with the first technical object and a second measurement value associated with the second technical object, and transmits the XY trend diagram with the operating point to the operator station client via the visualization service, wherein the XY trend diagram and/or the operating point has a reference to an object model, the operating point is influenceable by the technical object underlying the referenced object model, and an operator of the operator station client is visually presented with the referenced object model via the visualization service when selecting the operating point in the XY trend diagram.

2 Claims, 3 Drawing Sheets

(56) References Cited

U.S. PATENT DOCUMENTS

| | | | |
|---|---|---|---|
| 2016/0042541 A1* | 2/2016 | Nixon | G05B 23/0216 |
| | | | 715/771 |
| 2019/0102072 A1* | 4/2019 | Strinden | G06F 3/0483 |
| 2019/0259269 A1 | 8/2019 | Lutz | |

FOREIGN PATENT DOCUMENTS

| | | | | |
|---|---|---|---|---|
| EP | 0543760 | | 5/1993 | |
| EP | 1950639 | | 7/2008 | |
| EP | 2458464 | | 5/2012 | |
| EP | 2458464 A1 | * | 5/2012 | ........... G05B 19/409 |
| EP | 3528074 | | 8/2019 | |
| GB | 2568584 A | * | 5/2019 | ......... G05B 19/0426 |
| WO | 2010130343 | | 11/2010 | |

* cited by examiner

CONTROL SYSTEM FOR A TECHNICAL INSTALLATION WITH TREND CURVE DIAGRAM

BACKGROUND OF THE INVENTION

1. Field of the Invention

The invention relates to a control system of a technical installation, which has at least one operator station server and one operator station client.

2. Description of the Related Art

One aim in the automation of process-engineering installations is to operate the installations at their optimum operating points. In order to check the respective operating points, what are known as XY trends or XY trend diagrams have become established. In these XY trend diagrams, two (process-engineering) process measurement values are visualized as a 2-tuple with the same time base, together with a template characteristic. The two process measurement values may be the pressure and the temperature of a turbine, for example. Moreover, the historical course of the 2-tuple can also be represented, in order to be able to track a trend of the 2-tuple operating point.

In FIG. 1, an exemplary XY trend diagram 1 is shown with a pressure p along an X-axis and with a flow rate q along a Y-axis for checking an optimum operating point A1, A2, A3 of the 2-tuple pressure/flow rate of a mixer with a template characteristic 2 in accordance with the prior art.

Shown here is a historical course of the operating point A1, A2, A3, which in FIG. 1 is visualized by arrows between the three operating points A1, A2, A3 shown. The operating point A1, A2, A2 may be shifted graphically within the XY trend diagram 1 by a user (operator) of the technical installation. In order to be able to adjust the operating point A1, A2, A3 manually, however, the conventional methodology requires in-depth process-engineering know-how. In order to be able to influence the various process variables to set the operating point A1, A2, A3, "other screws" must be turned, e.g., various valves or motors for the pressure. Particularly when optimizing controllers and supervising, during the manual movement of process-engineering installation parts in order to set the optimum operating point A1, A2, A3, it is important to identify the relationships between the 2-tuple process measurement values, the influencing measuring points and other metadata of the 2-tuple process measurement values, in order to be able to set the operating points A1, A2, A3 in an optimum operating range in an efficient and error-free manner.

SUMMARY OF THE INVENTION

It is an object of the invention to provide a control system for a technical installation, which simplifies the optimization of an operating point of a technical installation by an operator of a technical installation and makes such an optimization more efficient.

This and other objects and advantages are achieved in accordance with the invention by a control system of a technical installation, which has at least one operator station server and one operator station client, where the operator station server has a visualization service for outputting image information to the operator station client. Stored in the operator station server are at least two object models of technical objects of the technical installation, where the technical objects each underlie the object models. The operator station server is configured to generate an XY trend diagram with an operating point visualized in the XY trend diagram from a first measurement value associated with the first technical object and a second measurement value associated with the second technical object,. Additionally, the operator station server is configured to transmit the XY trend diagram with the operating point to the operator station client via the visualization service.

The operating point of the control system in accordance with the invention has a reference to at least one of the at least two object models, where the operating point can be influenced by the technical object underlying the referenced object model.

Additionally, the control system in accordance with the invention visually presents a user (operator) of the operator station client with the at least one referenced object model via the visualization service when selecting the operating point in the XY trend diagram.

In accordance with the invention, innovated XY trend diagrams are expanded with referenced object models of underlying technical objects, where the object models can be retrieved by the operators in an interactive manner at run-time of the technical installation when optimizing the operating point. This expansion may occur, for example, during a configuration of the technical installation (what is known as the "engineering").

When using the control system in accordance with the invention, the operator (without needing to have in-depth knowledge of the technical installation) immediately knows which technical objects are related to an optimization (shifting) of the operating point in the XY trend diagram, so that it can turn these "setting wheels" in a targeted manner. An operation of the technical installation is therefore considerably more efficient than previously known.

The technical installation can be an installation from the process industry, such as a chemical, pharmaceutical or petrochemical installation, or an installation from the food and beverage industry. This also encompasses any installations from the production industry, such as factories, in which automobiles or goods of all kinds are produced. Technical installations that are suitable for implementing the inventive method can also come from the power generation sector. The term "technical installation" also encompasses wind turbines, solar installations or power generation plants.

These installations each have a control system or at least a computer-aided module for open-loop and closed-loop control of the running process or production. In the present context, a control system is understood to mean a computer-aided technical system, which comprises functionalities for representing, operating and controlling a technical system, such as a manufacturing or production installation. Here, the control system comprises sensors for determining measurement values, as well as various actuators. Additionally, the control system comprises what are known as process-oriented components, which serve to activate the actuators or sensors. Furthermore, the control system has inter alia means for visualizing the process installation and for engineering. The term control system is additionally intended to also encompass further computer units for more complex closed-loop controls and systems for data storage and data processing.

In the present context, an "operator station server" is understood to mean a server that centrally captures data of an operator control and monitoring system and generally also alarm and measurement value archives of a control system of a technical installation, and makes this data available to users (known as operators). The operator station server generally establishes a communication connection to automation systems of the technical installation and forwards data of the technical installation to what is known as the operator station client, which data serves the purpose of operator control and monitoring of an operation of the individual functional elements of the technical installation.

The operator station server may have client functions for accessing the data (archives, messages, tags, variables) of other operator station servers. This means that images of an operation of the technical installation on the operator station server can be combined with variables of other operator station servers (server-server communication). The operator station server can be a SIMATIC PCS 7 industrial workstation server from SIEMENS, without being restricted to this.

An operator is understood to mean a human user of the technical installation. The operator interacts with the technical installation or the control system thereof via specific user interfaces and controls specific technical functions of the technical installation. To this end, the operator may use an operator control and monitoring system (the operator station client in conjunction with the operator station server) of the control system.

A technical object is understood to mean a self-contained technical unit, which can be integrated into a higher-level control level. One such technical object may, for example, be an amalgamation of a plurality of measuring points or a larger installation part of an industrial installation. The technical object does not have to originate from the field of industrial installations, however, but rather can be a motor module of an automotive or a ship, for example.

Stored in the operator station server is a computer-implemented representation of the at least two technical objects, what are known as the object models. With these object models, it is possible to retrieve and further process measurement values of the technical objects underlying each of the object models. It may happen that a plurality of object models are referenced in the XY trend diagram, because they all have an influence on the operating point and cause a similar (or the same) technical effect.

Preferably, the operator of the operator station client, in the event that he performs a graphical shift of the operating point in an X- or Y-direction within the XY trend diagram, is only visually presented with the object model of an underlying technical object, which object model causes shift of the operating point in the specific X- or Y-direction. In the presently contemplated embodiment of the control system, the operator is only visually presented with the object model(s) which bring(s) about a shifting of the operating point within the XY trend diagram in one of the two specific directions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
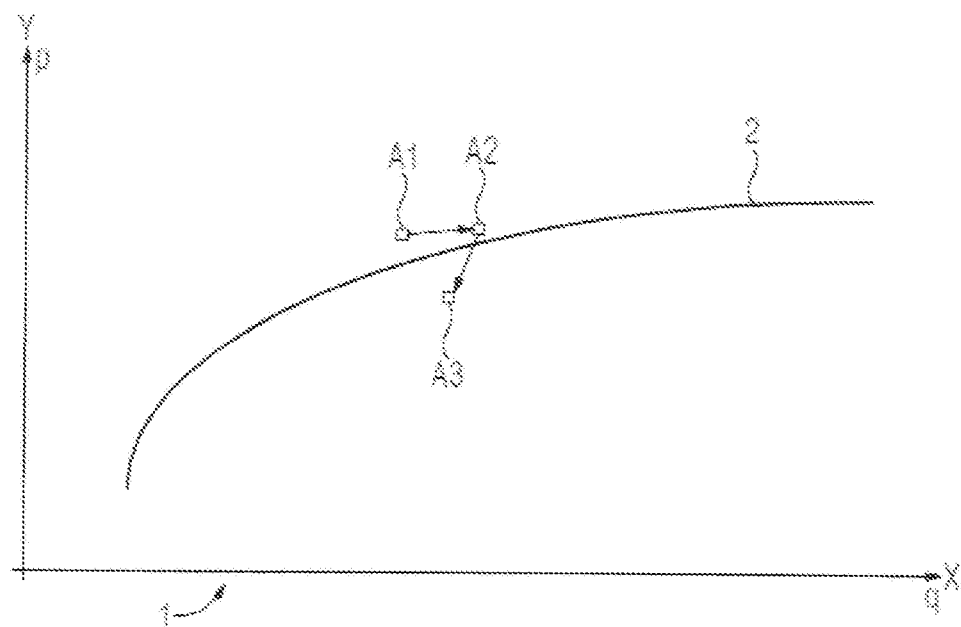
FIG. 1 is a graphical plot of an XY trend diagram in accordance with the prior art.
Figure 2:
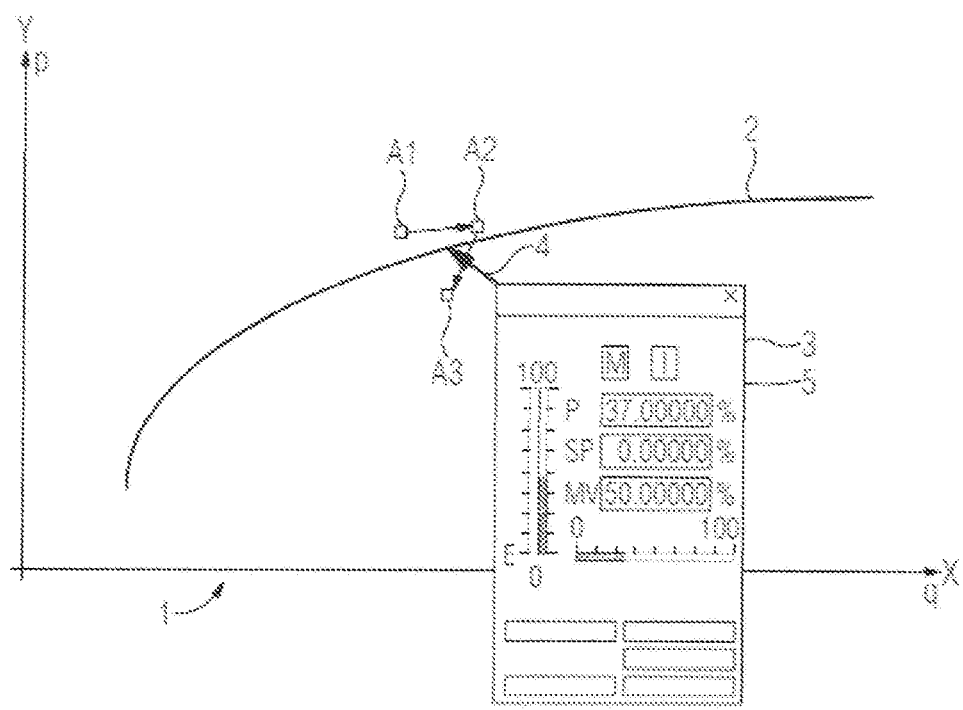
FIG. 2 is a graphical plot of an XY trend diagram in accordance with a first embodiment of the invention.

FIG. 2 substantially shows the same XY trend diagram as FIG. 1. In addition, stored in the XY trend diagram 1 is a reference to an object model 3 that is visually presented to an operator of a technical installation operating and monitoring the XY trend diagram. The last chosen operating point A3 lies somewhat below the optimum operating point, which is indicated with an arrow 4 in FIG. 2. If the operator now chooses this optimum operating point, such as by clicking on this point of the XY trend diagram 1 with a mouse cursor, then the operator is presented with the object model 3, which is referenced in the XY trend diagram 1 and is logically correlated, visually in the form of what is known as a faceplate. Here, the object model 3 is the object model, the underlying technical object of which must be manipulated to move the operating point to the desired position in the direction of the chosen position within the XY trend diagram 1. The present example involves the faceplate of a technical object formed as a valve controller, via which a pressure value 5 can be set accordingly.

Figure 3:
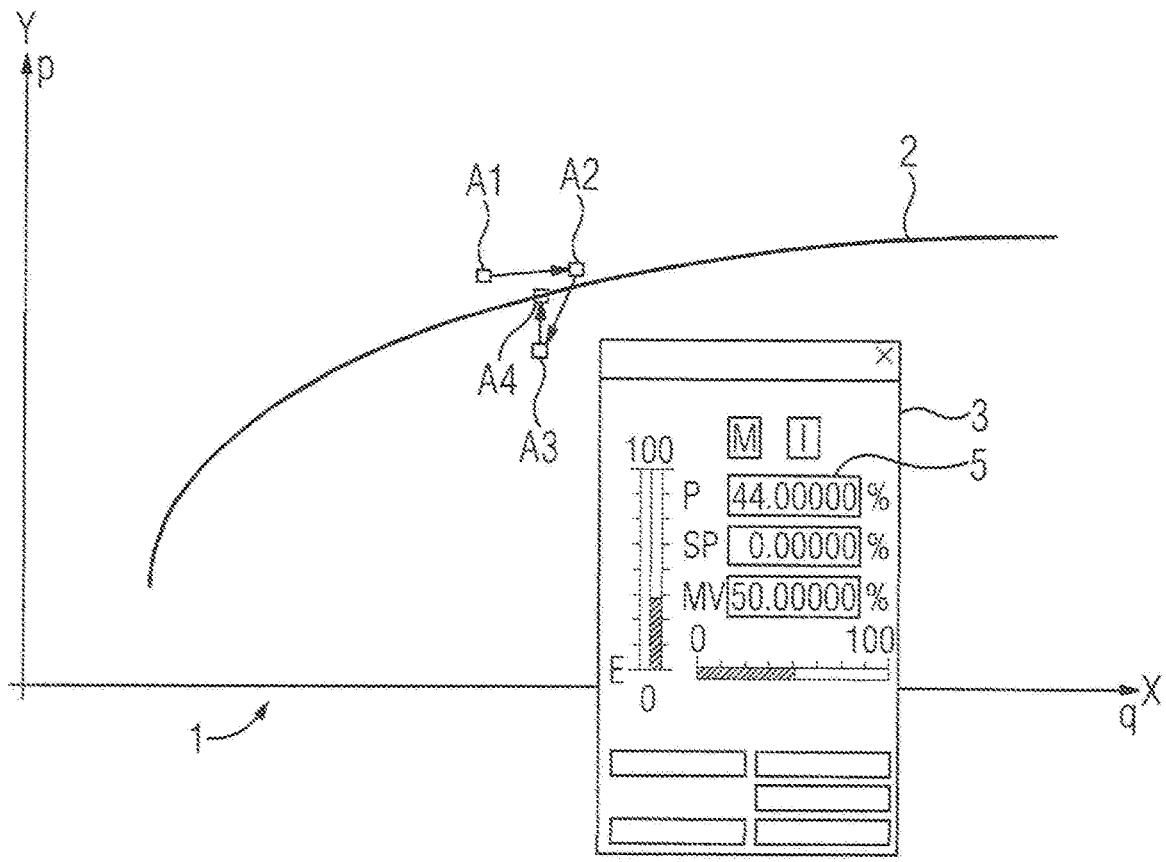
FIG. 3 is a graphical plot of an XY trend diagram in accordance with a second embodiment of the invention.

FIG. 3 shows how the new operating point A4 could be brought into an optimum range through the modification of the appropriate object model 3.

Figure 4:
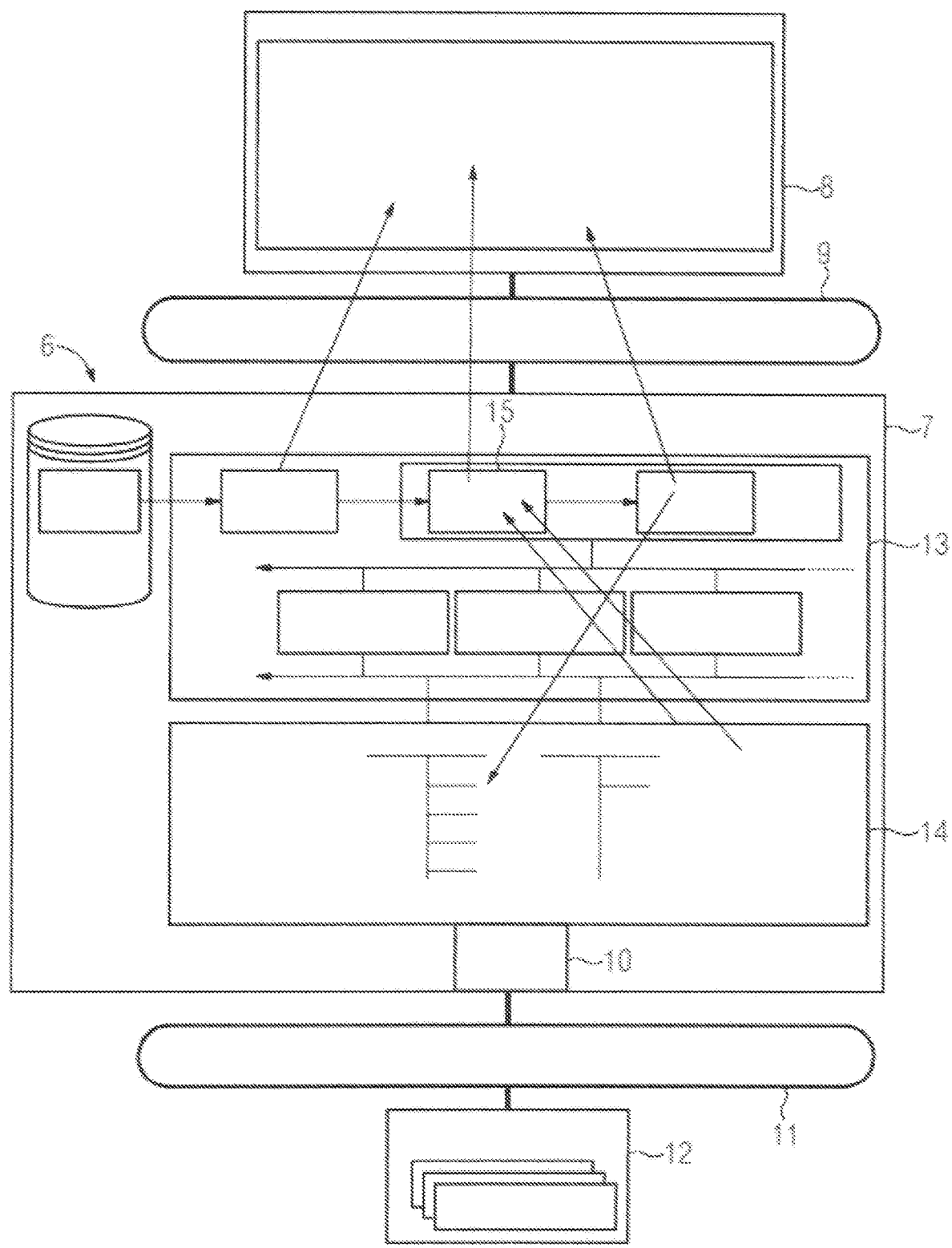
FIG. 4 is a schematic illustration of a part of a control system in accordance with the invention.

FIG. 4 shows a part of a control system 6 in accordance with the invention of a process installation. The control system 6 comprises a server of an operator control system or an operator station server 7 and an operator station client 8 associated therewith. The operator station server 7 and the operator station client 8 are interconnected via a terminal bus 9 and are connected to further components (not shown) of the control system 7, such as an engineering system server or a process data archive.

A user or operator has access to the operator station server 7 via the operator station client 8 over the terminal bus 9, in the context of operator control and monitoring. The terminal bus 9 can be formed, without being limited thereto, as an industrial Ethernet, for instance.

The operator station server 7 has a device interface 10, which is connected to an installation bus 11. This device interface 10 can be used by the operator system server 7 to communicate with an automation device 12 of the control system 6. The installation bus 11 can be formed, without being limited thereto, as an industrial Ethernet, for instance. In turn, the automation device 12 may be connected to any number of subsystems (not shown).

Integrated in the operator station server 7 is a visualization service 13, via which a transmission of (visualization) data to the operator station client 8 can occur. Additionally, the operator station server 7 has a process image 14 of the process installation.

Installation images, which have the innovated XY trend diagrams 1, are visualized on the operator station client 8 via the visualization service 14. If the operator would now like to optimize the operating point A1, A2, A3, A4 in a particular direction within the XY trend diagram 1, then a trend service 15 of the operator station server 7 evaluates the corresponding object models 3, which are referenced logically in the XY trend diagram 1, and visually represents the faceplate of the object model 3 in question in the installation image visualized in the operator station client 8 for the purpose of optimizing the operating point.

Although the invention has been illustrated and described in greater detail with the preferred exemplary embodiment and the figures, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system of a technical installation, comprising:
   an operator station client;
   at least one operator station server including a visualization service for outputting image information to the operator station client and at least two object models of technical objects of the technical installation stored within the at least one operator station server, said technical objects underlying the at least two object models;
   wherein the at least one operator station server is configured to automatically generate an XY trend diagram with an operating point visualized in the generated XY trend diagram from a first measurement value associated with a first technical object and a second measurement value associated with a second technical object; and
   wherein the at least one operator station server is further configured to transmit the generated XY trend diagram with the operating point to the operator station client via the visualization service;
   wherein at least one of (i) the generated XY trend diagram and (ii) the operating point has a reference to at least one object model of the object models;
   wherein the generated operating point is influenceable by the technical object underlying the referenced object model; and
   wherein an operator of the operator station client is visually presented with the at least one referenced object model via the visualization service when selecting the generated operating point in the generated XY trend diagram.

2. The control system as claimed in claim 1, wherein the operator of the operator station client, in an event that a graphical shift of the operating point in an X- or Y-direction within the generated XY trend diagram is performed by the operator, is only visually presented with the object model of an underlying technical object, which object model causes a shift of the generated operating point in the specific X- or Y-direction.

\* \* \* \* \*